Sept. 19, 1933.         D. B. MENTON         1,927,466
BALL BEARING
Filed Dec. 17, 1931         2 Sheets-Sheet 1

Inventor
D. B. Menton
By Clarence A. O'Brien
Attorney

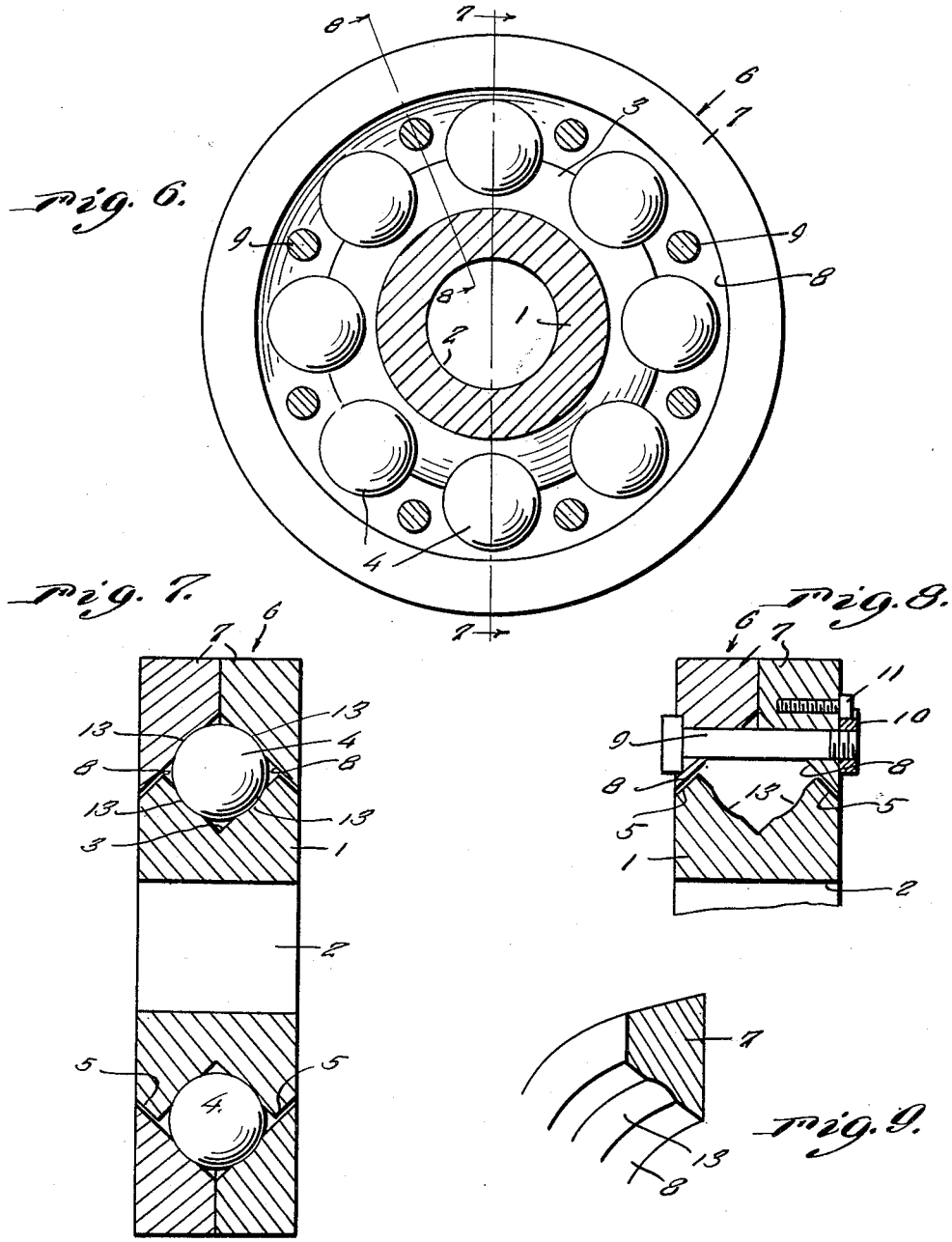

Patented Sept. 19, 1933

1,927,466

UNITED STATES PATENT OFFICE 1,927,466

BALL BEARING

David B. Menton, Ottawa, Ill.

Application December 17, 1931
Serial No. 581,726

4 Claims. (Cl. 308—196)

The present invention relates to a ball bearing and particularly to a combined radial and thrust bearing and has for some of its objects to provide a bearing of this character embodying a novel construction and assembly which will be extremely simple, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 6 is a vertical sectional view through another embodiment of the invention.

Figure 7 is a sectional view taken substantially on the line 7—7 of Figure 6.

Figure 8 is a sectional view taken substantially on the line 8—8 of Figure 6.

Figure 9 is a detail view in section through one of the outer cone sections showing the same formed with a groove in its ball contacting face.

Figure 1:
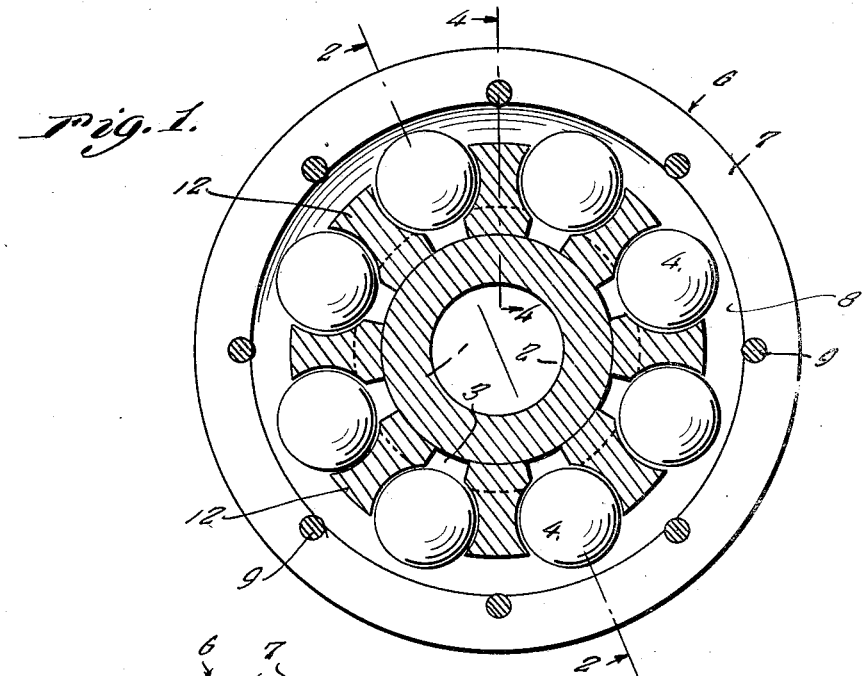
Figure 1 is a view in vertical section through an embodiment of the invention.

Referring now to the drawings in detail, it will be seen that the reference numeral 1 designates an inner cone having the usual opening 2 therein and further having a substantially V-shaped groove 3 in its outer periphery for the reception of the balls 4. The portions of the outer periphery of the inner cone 1 which are adjacent the walls of the groove 3 are inclined oppositely with respect to said walls, as at 5.

Figure 2:
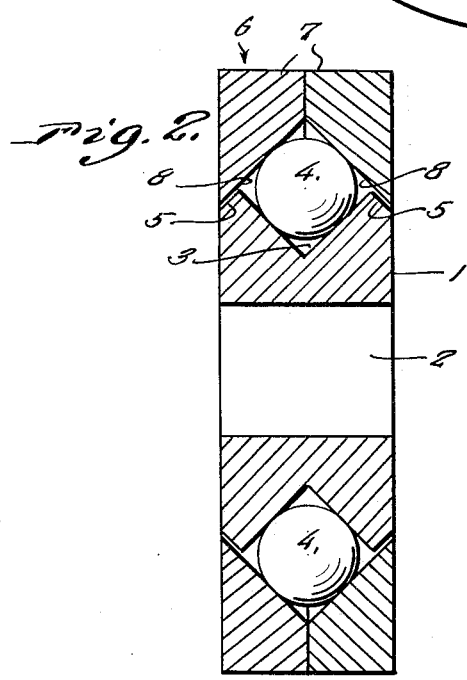
Figure 2 is a sectional view taken substantially on the line 2—2 of Figure 1.
Figure 3:
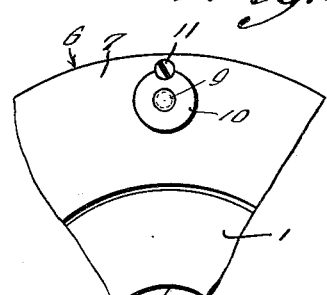
Figure 3 is a fragmentary view in elevation of a portion of the bearing.
Figure 4:
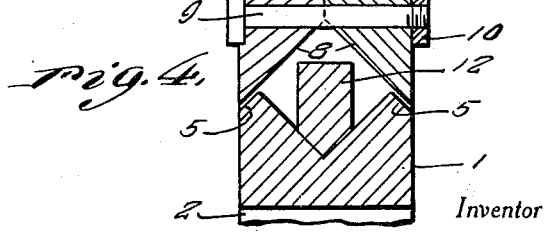
Figure 4 is a sectional view taken substantially on the line 4—4 of Figure 1.
Figure 5:
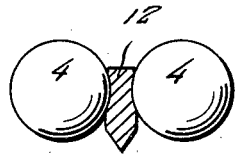
Figure 5 is a detail view in vertical section through one of the spacing studs.

The reference numeral 6 designates generally an outer cone which encircles the inner cone 1 and the balls 4. The outer cone 6 comprises a pair of annular complementary half sections 7 having oppositely beveled inner peripheries 8 which, in conjunction with each other, define a substantially V-shaped groove which is opposed to the groove 3 for the reception of the balls 4. The outer marginal portions of the beveled inner peripheries 8 of the sections 7 extend over the beveled portions 5 of the inner cone 1 in opposed relation thereto, as illustrated to advantage in Figure 2 of the drawings.

Bolts 9 extend through the sections 7 for securing said sections together and have threaded on one end the nuts 10. The nuts 10 are notched and engaged in the notches are the heads of the locking screws 11 which are threaded into one of the sections 7 for preventing accidental unthreading of the nuts.

Ball spacing studs 12 radiate on the inner cone 1 and project between the balls 4. The sides of the spacing studs 12 which are adjacent to the balls and which are contacted by said balls are provided with concavities for the reception of the balls. Through the medium of the studs 12 the balls are maintained in properly spaced relation and are caused to rotate with the inner cone 1.

In the modified form of the invention illustrated in Figures 6 and 8, inclusive, of the drawings, the securing bolts 9 traverse the groove defined by the half sections 7 of the outer cone 6 at a point to contact with the balls 4, thereby spacing said balls and preventing the same from crowding together in the cones. Then, the ball engaging walls of the inner and outer races are provided with channels 13 for the reception of the balls and in which said balls travel. Thus, comparatively large bearing surfaces are provided at four points for the balls.

It is to be understood, however, that this groove or channel 13 may be used with that form of the invention shown in Figures 1 to 5, both inclusive, as shown in detail in Figure 9, which shows one of the raceway forming members provided with this groove 13.

It is believed that the many advantages of a ball bearing constructed in accordance with the present invention will be readily understood, and although the preferred embodiments of the invention are as illustrated and described, it is to be understood that further changes in the details of the construction and in the combination and arrangement of parts may be resorted to which will fall within the scope of the invention as claimed.

What is claimed is:—

1. A ball bearing comprising an inner race member having a substantially V-shaped groove in its outer periphery, balls in the groove, radiating studs in the groove projecting between the balls for spacing said balls, the sides of said studs which are adjacent the balls having concavities therein for the reception of said balls, an outer race member encircling the inner race member and the balls, said outer race member including a pair of complemental half sections having oppositely beveled inner peripheries defining, in conjunction with each other, a substantially V-shaped groove in opposite relation to the first named groove for the reception of the balls, and securing elements passing through the sections for detachably securing said sections together.

2. A ball bearing comprising an inner race member having a substantially V-shaped groove in its outer periphery, the marginal portions of said outer periphery being oppositely inclined relative to the adjacent walls of the groove, balls mounted in the groove, an outer race member encircling the inner race member and the balls, said outer race member comprising a pair of annular, complemental half sections having oppositely beveled inner peripheries defining, in conjunction with each other, a substantially V-shaped groove in opposed relation to the first named groove for the reception of the balls, the outer marginal portions of the inner peripheries of the sections extending over the outer marginal portions of the outer periphery of the inner race member, bolts extending through the sections for detachably securing said sections together, and studs mounted radially in the first named groove and extending between the balls for spacing said balls.

3. A ball bearing comprising an inner race member having a substantially V-shaped groove in its outer periphery, the marginal portions of said outer periphery being oppositely inclined relative to the adjacent walls of the groove, balls mounted in the groove, an outer race member encircling the inner race member and the balls, said outer race member comprising a pair of annular, complemental half sections having oppositely beveled inner peripheries defining, in conjunction with each other, a substantially V-shaped groove in opposed relation to the first named groove for the reception of the balls, the outer marginal portions of the inner peripheries of the sections extending over the outer marginal portions of the outer periphery of the inner race member, bolts extending through the sections for detachably securing said sections together, and studs mounted radially in the first named groove and extending between the balls for spacing said balls, the sides of the studs which are adjacent the balls having concavities therein for the reception of said balls, retaining nuts threaded on the bolts and having notches therein, and locking screws threaded into one of the sections and engaged in the notches for securing the nuts in position.

4. A ball bearing comprising an inner race member having a substantially V-shaped groove in its outer periphery, balls in the groove, radiating studs in the groove projecting between the balls for spacing said balls, an outer race member encircling the inner race member and the balls, said outer race member including a pair of complemental half sections having oppositely beveled inner peripheries defining, in conjunction with each other, a substantially V-shaped groove in opposite relation to the first named groove for the reception of the balls, and securing elements passing through the sections for detachably securing said sections together.

DAVID B. MENTON.